Aug. 18, 1931.  H. S. EASTON  1,819,546

GOPHER TRAP

Filed June 11, 1930

Inventor

H. S. Easton

By Clarence A. O'Brien
Attorney

Patented Aug. 18, 1931

1,819,546

UNITED STATES PATENT OFFICE

HENRY S. EASTON, OF GREENFIELD, IOWA

GOPHER TRAP

Application filed June 11, 1930. Serial No. 460,456.

This invention relates broadly to traps, and the primary object of the present invention is to provide a trap especially designed for catching pocket gophers and like animals.

As is well known, it is very difficult to catch a pocket gopher as it emerges from his hole, since the gopher in so emerging from his hole pushes the dirt ahead of him which buries the trigger of ordinary traps and prevents the springing of the trap.

It is therefore the primary object of this invention to provide a trap whereby the trigger is so arranged that it will be impossible for the gopher to cover the same with dirt and which at the same time will be so positioned as to practically insure engagement of the trigger by the gopher for the springing of the trap.

Figure 1:
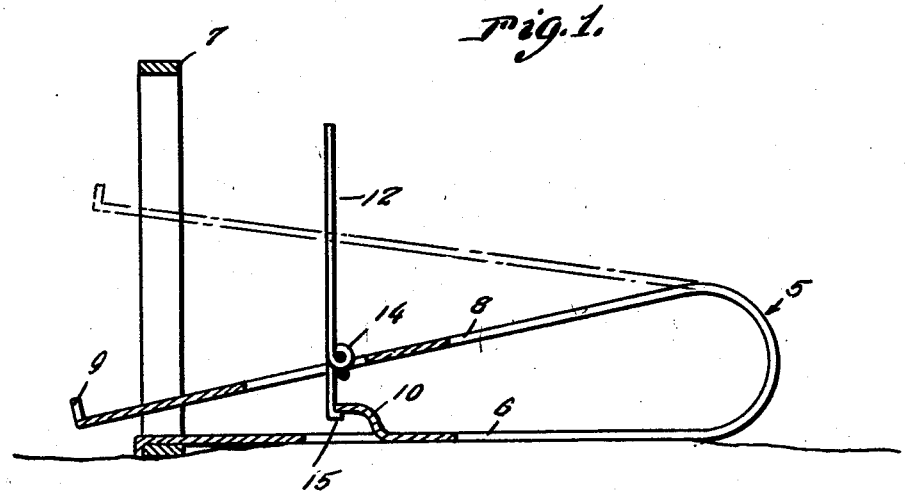
Figure 2:
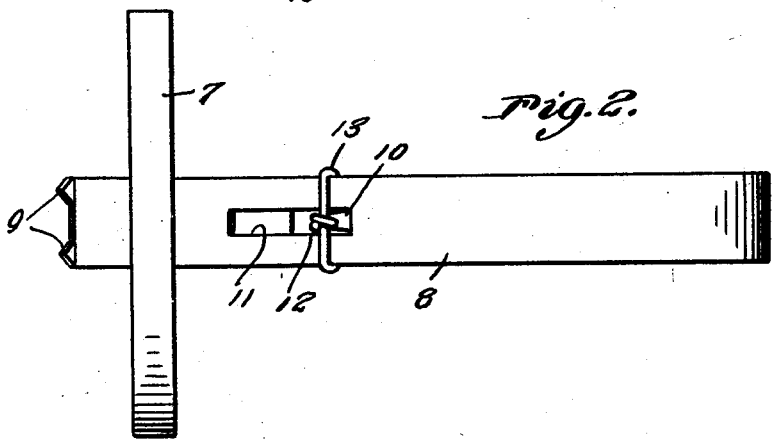
Figure 3:
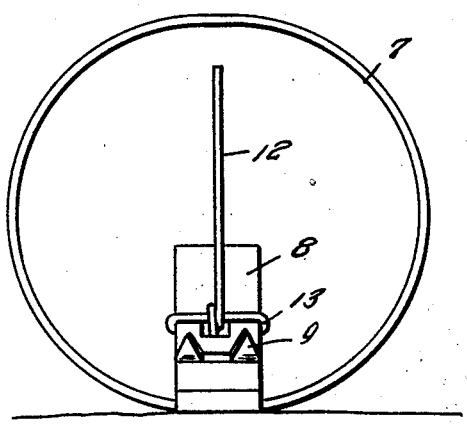

Other objects and advantages of the invention will become apparent during a study of the following description, taken in connection with the accompanying drawings, wherein:

Figure 1 is a detail view partly in section and partly in elevation of my improved trap, Figure 2 is a top plan view thereof, Figure 3 is an end elevational view thereof.

With reference more in detail to the drawings, it will be seen that my improved trap comprises a substantially U-shaped member designated generally by the reference character 5. The U-shaped member 5 is preferably formed of spring metal and includes a relatively stationary short leg 6 suitably secured at its free end to an annulus or ring like member 7 which may be also formed of metal or any other suitable material. It will be noted that the member 7 extends at substantially right angles to the leg 6.

The other leg of the U-shaped member is designated by the reference character 8. It will be noted that the member 8 is of a length greater than the leg 6 and has its free end adapted to swing somewhat in an arc within the confines of the annulus 7, the leg 8 adapted to be moved relative to the leg 6.

The leg 8 at the free end thereof is provided with a plurality of upstanding impaling or penetrating prongs 9, so that when the trap is sprung by the animal and the leg 8 swings upwardly to the position indicated in broken lines in Figure 1 the animal will become impaled on the projections 9 and caught between the free end of the leg 8 and the annulus 7 as is apparent.

The leg 6 inwardlly of its free end has struck out therefrom a tongue or catch 10. The leg 8 inwardly of its free end is provided with an elongated notch 11 within which is adapted to operate a trigger 12. The trigger 12 is pivotally carried by the leg 8 through the medium of a loop member 13 disposed about the leg 8 and having a portion thereof passing through an eye 14 formed on the trigger 12 upwardly from the lower end 15 of the trigger.

Trigger 12 is formed from a single length of wire or like material, and adjacent its lower end is looped to provide the eye 14, and at said lower end is then bent rearwardly to provide the hook projection 15. The upper portion of the trigger provides a suitable handle therefor to facilitate the "setting" of the trap, since obviously one gripping the upper portion of the trigger may readily swing the same about its pivot to engage hook end 15 with the tongue 10.

In setting the trap, the leg 6 is adapted to rest flatly on the ground near the hole from which the gopher or animal to be caught will emerge. When the leg 6 is in this position it will be seen that the annulus 7 at the forward end of the member 5 is disposed substantially vertically. In the setting of the trap, the leg 8 is pressed downwardly to assume the position suggested in full lines in Figure 1 and the trigger 12 swung to a vertical position so that its hook 15 engages the catch 10 for retaining the leg 8 in the referred to position.

The gopher or animal passing through the annulus 7 will obviously come into contact with the trigger 12 rocking the same and springing the hook 15 whereby the leg 8 which has been held under tension will spring upwardly to the position shown in broken lines in Figure 1 so that the prongs 9 will penetrate the body of the gopher impaling the animal on the leg 8 within the confines of the annulus 7.

Even though I have herein shown and described the preferred embodiment of my invention, it is to be understood that the same is susceptible to changes fully comprehended by the spirit of the invention as herein described, and the scope of the appended claims.

Having thus described my invention, what I claim as new is:

1. A trap comprising a substantially U-shaped member formed of resilient material and embodying a pair of legs of unequal length, one of said legs adjacent the free end thereof having a tongue pressed therefrom, the other of said legs adjacent one end thereof provided with a slot, a latch swingably mounted on the last mentioned leg and having one end thereof provided with a hook for engaging said tongue, the distance between the pivots of the latch and said hook being less than the distance between the legs of said U-shaped member when the legs are in spaced parallel relation whereby when said hook is engaged with said tongue said other leg will be disposed at an acute angle to the horizontal, and said other leg at its free end provided with impaling tongues.

2. A trap comprising in combination an annular member, a substantially U-shaped resilient member, said member having one leg thereof at the free end of the leg secured to said annular member, the other leg of said U-shaped member provided with a slot, a loop engaging said other leg adjacent said slot, a trigger provided adjacent one end with an eye for accommodating a portion of said loop member, said trigger at said one end being bent rearward, the first mentioned leg of said U-shaped member having a catch pressed therefrom and engageable with the rearward extension of said trigger, said other leg of said U-shaped member having its free end extending through and beyond said annular member, and at said free end provided with impaling tongues.

In testimony whereof I affix my signature.

HENRY S. EASTON.